United States Patent [19]

McMaster

[11] Patent Number: 5,110,338
[45] Date of Patent: May 5, 1992

[54] METHOD AND APPARATUS FOR HEATING A GLASS SHEET

[75] Inventor: Harold A. McMaster, Perrysburg, Ohio

[73] Assignee: Glasstech, Inc., Perrysburg, Ohio

[21] Appl. No.: 686,498

[22] Filed: Apr. 17, 1991

[51] Int. Cl.[5] ............... C03B 23/02; C03B 35/22
[52] U.S. Cl. ....................... 65/182.2; 65/157;
  65/273; 65/286; 65/354; 432/159; 432/170;
  432/172
[58] Field of Search ............ 126/59.5; 432/159, 170,
  432/172; 65/157, 182.2, 273, 286, 354, 351

[56] References Cited

U.S. PATENT DOCUMENTS 3,997,317 12/1976 Dicks .................. 65/351 X
4,137,648 2/1979 Rhodes ................. 432/172 X
4,222,763 9/1980 McMaster ................ 65/287

Primary Examiner—Robert L. Lindsay
Attorney, Agent, or Firm—Brooks & Kushman

[57] ABSTRACT

An apparatus (101) is disclosed for treating a glass sheet (22) including a substantially enclosed chamber (14) containing a chamber atmosphere (24) in which the glass sheet (22) may be treated. Apparatus (10) also includes gas turbine engine (12) which generates heated pressurized exhaust gases which are provided to chamber (14) to treat glass sheet (22). In one embodiment, conveyor (26) is used to support glass sheet (22) in the chamber atmosphere (24). Air bed plate (72) is used to support the glass in an alternate apparatus embodiment (68).

15 Claims, 3 Drawing Sheets

METHOD AND APPARATUS FOR HEATING A GLASS SHEET

TECHNICAL FIELD

This invention relates to devices used to treat glass sheets, and more particularly to devices and methods used to provide a heated chamber atmosphere to devices used to treat glass sheets.

BACKGROUND ART

Glass is heated for a variety of purposes. These purposes include, among other things, bending or tempering individual heated glass sheets. Typically, glass is heated to some desired temperature through the use of electrical or gas heaters. Such heaters may be exterior or interior to the processing apparatus.

One particularly good method for providing a heated chamber atmosphere is disclosed in U.S. Pat. No. 4,222,763 (hereinafter '763 patent). This patent is incorporated by reference herein. The '763 patent discloses the use of a compressor or pump to supply compressed air to a heat exchanger which heats the air supplied to it, and distributes it to the glass treating apparatus.

The '763 patent also discloses the use of gas jet pumps for producing a secondary flow of heated gas from the primary flow of heated gas provided by the compressor and heat exchanger. The use of heated pressurized air directed at the glass sheet, as shown in the '763 patent, encourages heat transfer between the chamber atmosphere to the glass sheet.

In practice, however, the structure described in the '763 patent necessitates maintenance on both the compressor and the heat exchanger. Additionally, the compressor cannot practicably be located downstream from the heat exchanger as heated air causes additional wear upon pump parts. Additional maintenance in systems disclosed in the prior art arises from the need for maintenance of the conveyor system used in prior systems such as the one disclosed in the '763 patent to convey the glass sheet through the glass treating apparatus.

DISCLOSURE OF INVENTION

An object of the present invention is to provide an improved glass sheet treating apparatus.

Another object of the present invention is to provide an improved method of providing heated, pressurized gases to a glass sheet treating apparatus.

Yet, another objective of the present invention is to reduce maintenance costs, and the number of moving parts needed to provide heated, pressurized gases to a glass sheet treating apparatus.

Another object of the present invention is to reduce the maintenance costs associated with the means for supporting and conveying the glass sheet through the glass sheet treating apparatus.

In carrying out these and other objects of the present invention, the glass heating apparatus claimed herein includes a substantially enclosed chamber containing an atmosphere in which the glass sheet may be treated. The apparatus also includes a gas turbine engine which generates heated, pressurized exhaust gases which are provided to the chamber to treat the glass sheet. In one embodiment, a conveyor is used to support the glass sheet in the chamber atmosphere. In another embodiment, an air bed is used to support the glass sheet in the chamber atmosphere.

These and other objects, features and advantages of the invention will be apparent upon further review of the following description to be read in connection with the accompany drawings.

BEST MODE FOR CARRYING OUT THE INVENTION

Figure 1:
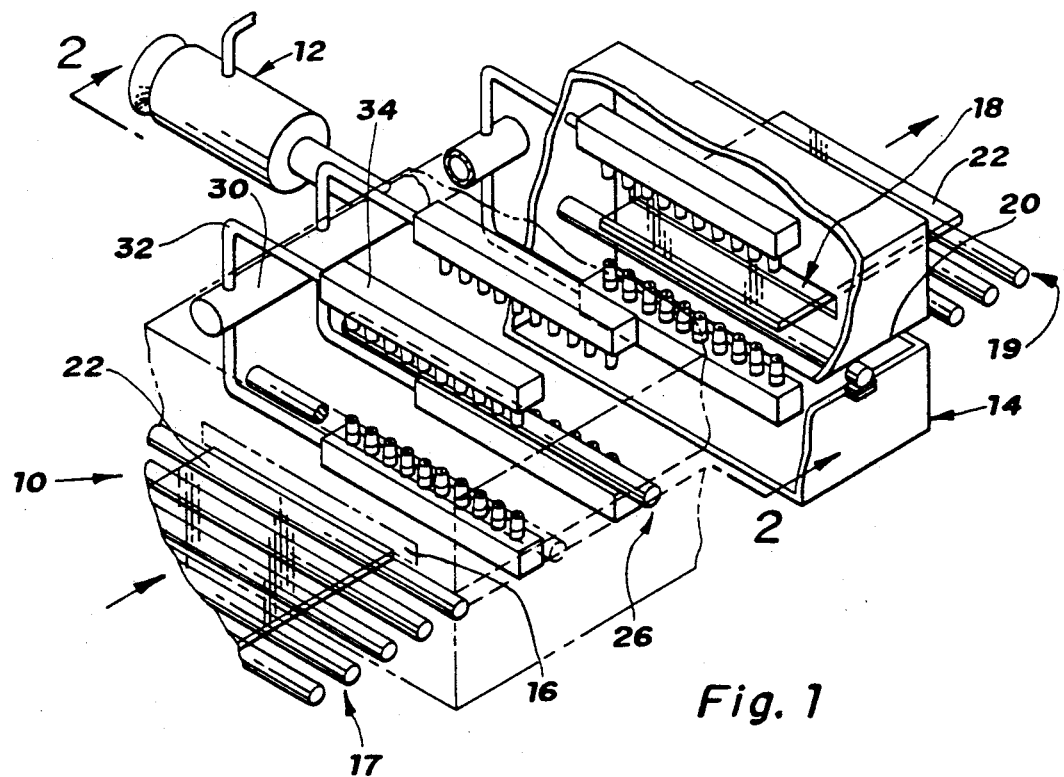
FIG. 1 is a perspective view of a glass sheet treating apparatus constructed in accordance with the present invention, illustrating the use of a gas turbine engine to provide heated, pressurized exhaust gases to the apparatus.

FIG. 1 illustrates a glass sheet treating apparatus 10 including gas turbine engine 12. Gas turbine engine 12 has the characteristic of generating heated, pressurized combustion products.

Typical prior art heaters used electric or gas heat to provide heated gases but such heaters would not, of course, provide pressurized gases. The structure disclosed in the '763 patent first provided heated, pressurized gases by using a compressor and then heating the pressurized air to the 1200° F.–1300° F. using a heat exchanger. Nonetheless, from a practical standpoint, in the structure disclosed in the '763 patent, the heat exchanger had to be located downstream from the compressor, because heated gas exacerbated wear on pump parts and increased maintenance costs. Even with the heater located downstream, however, maintenance costs necessarily included moving parts on the pump and the heater. Using gas turbine engine 12 to provide heated, pressurized combustion products to glass treating apparatus 10 has significant advantages over the prior art. Utilization of gas turbine engine 12 essentially combines two pieces of machinery, thereby reducing the number of moving parts and concomitant maintenance. Maintenance costs on gas turbine engine 12 are expected to be sufficiently lower than maintenance on the analogous compressor and heat exchanger of the '763 patent to justify the additional initial expenditure.

Apparatus 10 also includes chamber 14, inlet 16, exit 18 and longitudinal slots 20. Inlet 16 is an entry into chamber 14 and exit 18 as an exit from chamber 14. Inlet conveyor 17 (not shown) conveys glass sheet 22 into glass sheet treating apparatus 10. Exit conveyor 19 carries glass sheet 22 out of glass sheet treating apparatus 10.

Also shown in FIG. 1 is plenum 30 which receives heated, pressurized combustion products from gas turbine engine 12, and heated air conduits 32, which conduct heated, pressurized exhaust gases to manifold 34, both above longitudinal slots 20 and below longitudinal slots 20.

Figure 2:
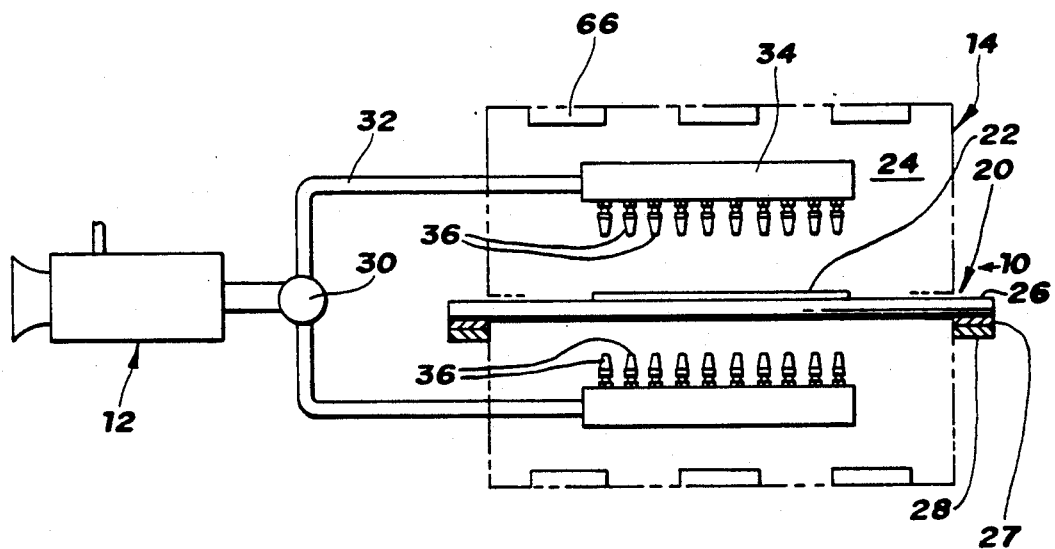
FIG. 2 is a sectional view of the glass sheet treating apparatus shown in FIG. 1 taken along 2—2 of FIG. 1.

FIG. 2 is a sectional view of the glass sheet treating apparatus shown in FIG. 1 taken along axis 2—2 of FIG. 1. FIG. 2 shows glass sheet 22 supported in chamber atmosphere 24 upon conveyor rollers 26. Conveyor rollers 26 are supported upon member 27 and driven by drive loop/support track assembly 28 which are of conventional design and are more fully described in the '763 patent.

FIG. 2 also shows gas turbine engine 12. As in FIG. 1, gas turbine engine 12 is connected to plenum 30 which supply conduits 32. Conduits 32 are connected to manifolds 34 within chamber 14 which distribute heated, pressurized gases to jet pumps 36. Jet pumps 36 are driven by the heated, pressurized gases provided by engine 12 and entrain chamber atmosphere 24 with the heated pressurized gases provided by engine 12 to provide a jet pump output of heated pressurized gas which has a mass flow rate significantly greater than that of gas turbine engine 12.

The use of jet pumps 36 greatly enhances the circulation of heated gas within chamber 14. In turn, increased circulation increases the rate of heat transfer between glass sheet 22 and chamber atmosphere 24, thereby more efficiently heating glass sheet 22. In the preferred embodiment, jet pumps 36 are located to direct the jet pump output toward glass sheet 22 as shown in FIG. 2 to further increase the rate of heat transfer between glass sheet 22 and the chamber atmosphere 24. FIG. 2 shows the use of jet pumps 36 both above and below glass sheet 32 to increase heat transfer between glass sheet 22 and chamber atmosphere 24 on both large surfaces of glass sheet 22.

It should be appreciated that in order to maintain the pressure within the chamber 14 constant, an exhaust outlet, not shown, of conventional design will be utilized. Since the gas turbine engine will be continually providing new hot pressurized gas to the chamber, the exhaust gas flow must have a comparable mass flow rate in order to maintain the system at an equilibrium state. One should appreciate that the hot pressurized gases supplied by the gas turbine 12 does much more than merely heat the combustion chamber. These gases provide mechanical energy to drive the jet pumps to circulate the chamber atmosphere. The mass flow of the gas flowing through the jet pump will be significantly greater than the gas turbine engine output. The ratio of the mass flow output of the jet pump versus the gas turbine engine will vary with the specific application, gas turbine engine output pressure and the desired jet pump output velocity. However, the ratios in the 5:1 to 10:1 are in the preferred range.

Figure 3:
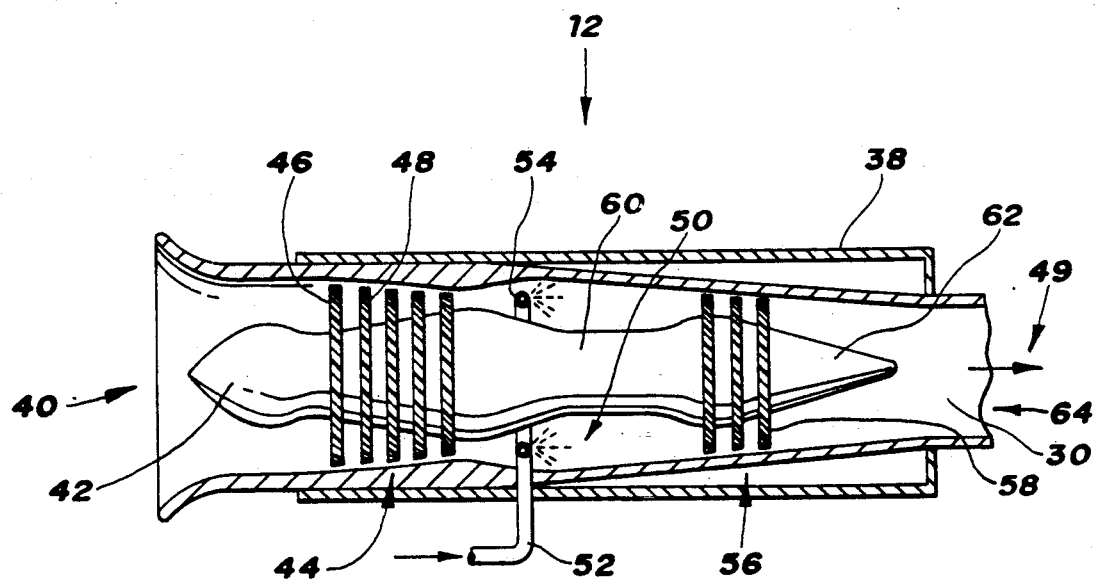
FIG. 3 is a schematic cross-sectional side view of the gas turbine engine used in the present invention.

FIG. 3 shows a schematic cross-sectional side view of the gas turbine engine used in the present invention. Gas turbine engine 12 includes housing 38. Housing 38 is provided with an inlet 40. Inlet 40 is a generally conical section which admits an oxygen containing gas, such as air into engine 12 around cone 42. Gas turbine engine 12 also includes a multistage axial compressor 44, which is used to provide pressurized air to gas combustion chamber 50. Compressor 44 is made up of rotatable compressor vanes 46 and fixed vanes 48. Rotatable compressor vanes 46, when rotated, take in air from inlet 40 and distribute it around cone 42 and compress it along longitudinal axis 49 of gas turbine engine 12. Fixed vanes 48 set up multiple pressure stages which sequentially increase the inlet gas pressure and inhibit air flow back towards inlet 40.

Gas turbine engine 12 also includes combustion chamber 50 wherein fuel is burned. Fuel is provided to gas turbine engine 12 via fuel line 52 and fuel ring 54. Fuel is sprayed into combustion chamber 50, where it is ignited and burned. Pressurized, heated combustion products then flow out along longitudinal axis 49 of gas turbine engine 12 and through turbine drive 56 which is driven by rotatable drive vanes 58. Turbine drive 56, in turn, drives and rotates shaft 60 which is used to drive compressor 44. Heated compressurized gas is then diffused along diffuser 62, and exits gas turbine engine 12 through outlet 64. Engine 12 can provide significantly heated and pressurized combustion products. Heat is generated to the desired level by burning fuel and air in proportions known in the prior art. This burning process creates a large pressure increase from ambient atmosphere pressures. This pressure increase is due to (1) the pressure added by compressor 44; (2) the pressure added by the heat released during combustion; and (3) by the increase in the number of moles of total gas molecules. That is, combustion of a complex carbon molecule results in the creation of numerous molecules of water and $CO_2$ and/or $CO$. This increase in the total number of molecules after combustion contributes to the increases in gas pressure.

In the preferred embodiment of the present invention, supplemental heaters 66 are provided to supplement heat added to chamber 14 by gas turbine engine 12. These supplemental heaters are shown in FIG. 2. The gas turbine will operate at a rather lean air fuel ratio resulting in significant excess oxygen in the out gas stream. It is therefore possible to use an afterburner downstream from the jet engine but upstream from chamber 14 to provide supplemental heat.

Figure 4:
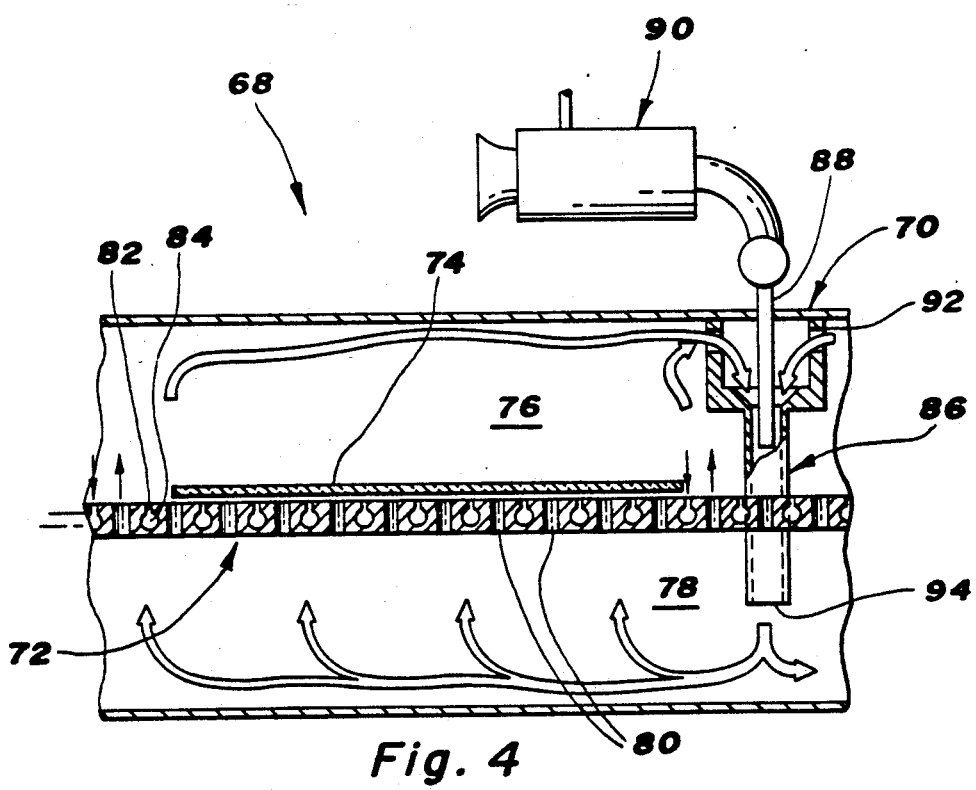
FIG. 4 is a cross-sectional side view of an alternative embodiment of the present invention, showing the use of an air bed to support the glass sheet in the glass sheet treating apparatus.

An alternative glass sheet treating apparatus embodiment 68 is shown in FIG. 4. Apparatus 68 is provided with a chamber 70 having an internal horizontal air bed plate 72 supported therein for carrying a glass sheet 74. Air bed plate 72 divides the interior of chamber 70 into an upper and lower portion 76 and 78, respectively. Plate 72 is provided with a plurality of through holes 80 which extend through the plate 70 connecting the chamber upper and lower portions 76 and 78. The plate is also provided with a plurality of outlet ports 82 which communicate with a series of outlet passages 84 formed internally in plate 70. The atmosphere within the lower chamber portion 78 is maintained at a significantly higher pressure than the upper chamber portion 76 so as to cause a flow of gas from the lower chamber to the upper chamber via through holes 80. A portion of this gas which enters chamber upper portion 76 exits through the outlet ports 82. Outlet ports 82 are particularly useful in maintaining the glass in flat coplanar relation to the upper surface of plate 72.

A pressure differential between the atmosphere and the upper and lower chamber portions 76 and 78 are maintained by jet pump 86. Jet pump 86 is driven by a source of heated high pressure gas supplied by conduit 88 connected to the outlet of gas turbine engine 90. Gas turbine engine 90 functions similar to gas turbine engine 12 described with reference to the first apparatus embodiment shown in FIGS. 1-3. Jet pump 86 is provided with a gas inlet 92 and the gas outlet 94 oriented to transfer gas from the chamber upper region 76 to lower region 78. In operation, the high pressure stream of gas is supplied to jet pump 86 by conduit 88 thereby entraining gas supplied to the jet pump gas inlet 92 from upper chamber portion 76 and manifold 96 so that the flow through jet pump gas outlet 94 is significantly greater than the output of jet engine 90.

When glass sheet 74 is supported on air bed 72, the glass sheet does not contact any parts within chamber 70. Thus, problems with uneven heating and loss of temperature at contact points between glass sheet 74 and plate 72 are eliminated. Additionally, contamination of glass sheet is reduced. Finally, having no moving parts, air bed 72 again reduces the maintenance costs over other conveyors. As noted above, the use of jet pumps essentially reuses heated chamber atmosphere, thus reducing the amount of heat that needs to be supplied to chamber 70. This in turn allows efficient use and reuse of the hot pressurized gases provided by the gas turbine engine.

Figure 5:
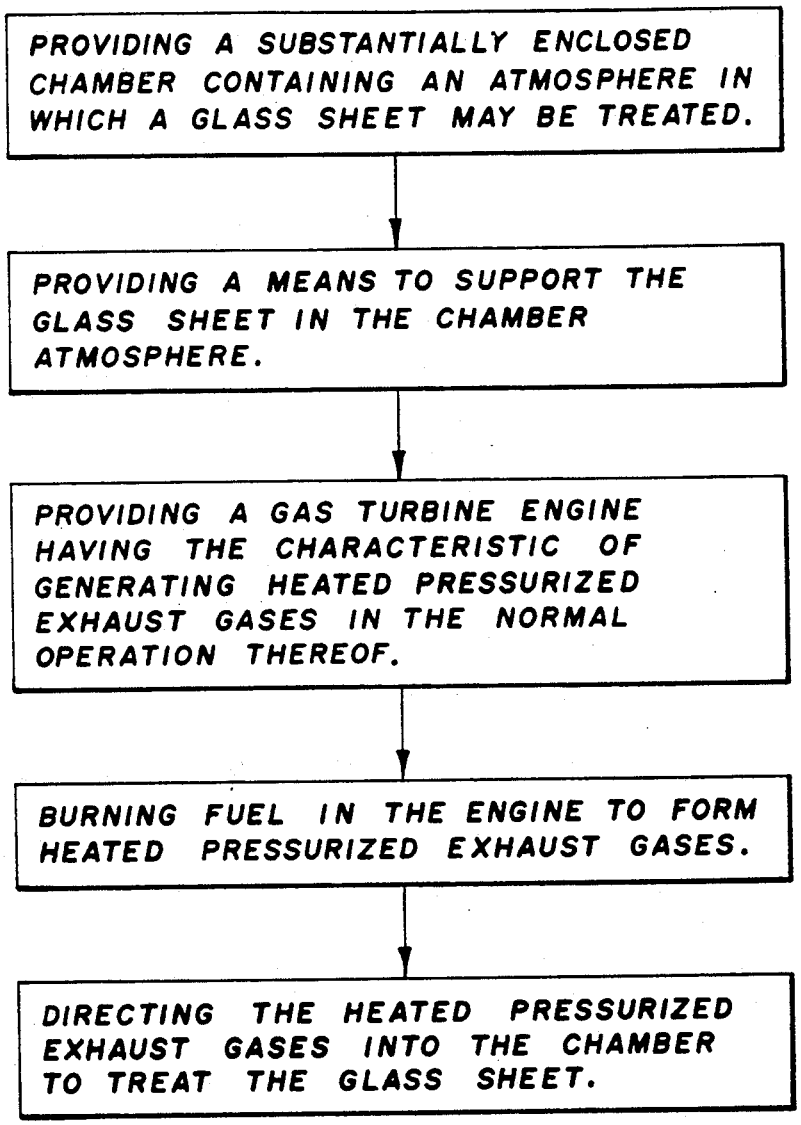
FIG. 5 is a block diagram illustrating the steps of the method used to treat glass sheets.

FIG. 5 discloses a block diagram of the steps of an improved method to treat a glass sheet. A substantially enclosed chamber is provided which contains an atmosphere in which a glass sheet may be treated. This may be done substantially as discussed above. Second, a means to support the glass sheet within the chamber atmosphere is provided in a way known in the art. Third, a gas turbine engine is provided having the characteristic of generating heated, pressurized exhaust gases in the normal operation thereof. Fourth, fuel is burned in the engine to form heated, pressurized exhaust gases. Finally, the heated, pressurized exhaust gases are directed into the chamber to treat the glass sheet.

Of course, the invention herein could be modified in a number of ways, and the preferred embodiment as shown and the alternative embodiments are not intended to illustrate all possible forms of the invention. Other alternative embodiments could easily be created by one with ordinary skill in the art without departing from the spirit and scope of the invention as disclosed herein.

I claim:

1. An apparatus for treating a glass sheet, comprising:
a substantially enclosed chamber containing an atmosphere in which the glass sheet may be treated;
means for supporting the glass sheet in the chamber atmosphere; and
a gas turbine engine having the characteristic of generating heated pressurized exhaust gases in the normal operation thereof, the engine connected to the chamber to provide the exhaust gases to the chamber to treat the glass sheet.

2. The apparatus of claim 1 further comprising a jet pump within the chamber, the jet pump being connected to receive the exhaust gases from the engine and to be driven thereby for entraining the atmosphere in the chamber with the exhaust gases from the engine to provide a jet pump output of heated pressurized gas.

3. The apparatus of claim 2 wherein the jet pump is located to direct the jet pump output toward the glass sheet to increase the rate of heat transfer between the glass sheet and the chamber atmosphere.

4. The apparatus of claim 2 further comprising a heater to supplement the heat provided to the chamber by the gas turbine.

5. The invention of claim 2 wherein the means for supporting the glass sheet in the chamber is a plate dividing the chamber into two portions, the plate having a plurality of holes adapted to be adjacent to the glass sheet and to receive the jet pump output to form an air bed between the glass sheet and the plate to support the glass sheet thereon.

6. The apparatus of claim 2 wherein the mass flow rate of the output of the jet pump is significantly greater than that of the gas turbine engine.

7. The invention of claim 1 wherein the engine includes an air inlet, a compressor, a combustion chamber, a turbine which drives the compressor and an outlet nozzle.

8. An apparatus to provide heated, pressurized exhaust gases to a glass sheet treating chamber, the apparatus comprising:
an air inlet;
a compressor;
a combustion chamber;
a turbine for driving the compressor; and
an outlet nozzle to provide heated, pressurized combustion products to the glass sheet treating apparatus.

9. A method for treating a glass sheet, comprising:
providing a substantially enclosed chamber containing an atmosphere in which the glass sheet may be treated;
providing a means to support the glass sheet in the chamber atmosphere;
providing a gas turbine engine having the characteristic of generating heated pressurized exhaust gases in the normal operation thereof;
burning fuel in the engine to form heated pressurized exhaust gases; and
directing the heated pressurized exhaust gases into the chamber to treat the glass sheet.

10. The invention of claim 8 further comprising providing a jet pump located within the chamber to be driven by the heated pressurized exhaust gases provided by the engine for entraining the chamber atmosphere with the heated pressurized exhaust gases to provide a jet pump output of heated pressurized gas.

11. The apparatus of claim 10 wherein the mass flow rate of the output of the jet pump is significantly greater than that of the gas turbine engine.

12. The invention of claim 10 including directing the jet pump output toward the glass sheet to increase the rate of heat transfer between the glass sheet and the chamber atmosphere.

13. The invention of claim 10 including providing a heater to supplement the heat provided to the chamber by the engine.

14. The invention of claim 10 wherein the step of providing a means to support the glass sheet in the chamber includes providing a plate to divide the chamber into an upper and lower portion, said plate having a plurality of through holes extending therethrough to allow gas to flow from the chamber lower portion to the upper portion forming a gas bed between the glass sheet and the plate to support the glass sheet thereon.

15. The invention of claim 14 wherein said plate is provided with a plurality of outlet ports and a plurality of internal outlet passageways forming an outlet for gas to the chamber upper portion.

* * * * *